(12) United States Patent
Vaccari et al.

(10) Patent No.: US 11,248,411 B2
(45) Date of Patent: Feb. 15, 2022

(54) PROCESS FOR THE REALIZATION OF REINFORCING BARS FOR DOOR AND WINDOW FRAMES

(71) Applicant: Graf Synergy S.r.l., Nonantola (IT)

(72) Inventors: Andrea Vaccari, Nonantola (IT); Denis De Grandis, Nonantola (IT)

(73) Assignee: Graf Synergy S.r.l., Nonantola (IT)

( * ) Notice: Subject to any disclaimer, the term of this patent is extended or adjusted under 35 U.S.C. 154(b) by 0 days.

(21) Appl. No.: 16/979,521

(22) PCT Filed: Mar. 20, 2019

(86) PCT No.: PCT/IB2019/052251
§ 371 (c)(1),
(2) Date: Sep. 10, 2020

(87) PCT Pub. No.: WO2019/180630
PCT Pub. Date: Sep. 26, 2019

(65) Prior Publication Data
US 2020/0408030 A1 Dec. 31, 2020

(30) Foreign Application Priority Data
Mar. 20, 2018 (IT) .................. 102018000003783

(51) Int. Cl.
*E06B 3/22* (2006.01)
*E06B 3/263* (2006.01)
*B29L 12/00* (2006.01)

(52) U.S. Cl.
CPC .......... *E06B 3/222* (2013.01); *E06B 3/26345* (2013.01); *B29L 2012/005* (2013.01); *E06B 2003/224* (2013.01); *E06B 2003/225* (2013.01)

(58) Field of Classification Search
CPC . E06B 3/222; E06B 3/105; E06B 3/16; E06B 3/20; E06B 3/22; E06B 3/221;
(Continued)

(56) References Cited

U.S. PATENT DOCUMENTS

RE15,364 E * 5/1922 Rypinski .................. B21J 15/02
219/150 R
1,887,415 A * 11/1932 Lobell ...................... E06B 3/16
49/484.1
(Continued)

FOREIGN PATENT DOCUMENTS

WO WO 2017/149460 9/2017
WO WO 2019/180630 9/2019

OTHER PUBLICATIONS

International Search Report and Written Opinion dated Jun. 18, 2019 from the International Searching Authority Re. Application No. PCT/IB2019/052251. (8 pages).

*Primary Examiner* — Kyle J. Walraed-Sullivan

(57) ABSTRACT

The process for the realization of reinforcing bars for door and window frames comprises:
a step of providing a reinforcing bar (1) made of a metal material having a drillable face (2); and
a step of drilling of the drillable face (2) to obtain a fixing hole (5) in the reinforcing bar (1) having a characteristic dimension (A) comprised between 2 mm and 5 mm, wherein the reinforcing bar (1) is insertable into a profiled element (4) made of plastic material and the fixing hole (5) is configured to be penetrated by the softened plastic material of the profiled element (4) to define a riveting portion (6) for fixing the profiled element (4) to the reinforcing bar (1).

14 Claims, 2 Drawing Sheets

(58) Field of Classification Search
CPC .............. E06B 3/223; E06B 2003/223; E06B 2003/225; E06B 2003/227; E06B 2003/228; E06B 2003/7084
See application file for complete search history.

(56) References Cited

U.S. PATENT DOCUMENTS

| | | | | |
|---|---|---|---|---|
| 2,366,274 | A * | 1/1945 | Luth | B29C 66/131 428/223 |
| 3,308,225 | A * | 3/1967 | Wells | A47J 31/053 264/249 |
| 3,754,319 | A * | 8/1973 | Miori | B29C 66/21 29/509 |
| 4,227,346 | A * | 10/1980 | Kubik | E05D 15/565 49/425 |
| 4,253,226 | A * | 3/1981 | Takeda | A44B 17/0035 24/691 |
| 4,478,543 | A * | 10/1984 | Lyon | B29C 65/602 411/15 |
| 4,478,544 | A * | 10/1984 | Strand | B29C 66/81423 411/34 |
| 4,640,078 | A * | 2/1987 | Haffer | E06B 3/222 49/DIG. 1 |
| 4,822,671 | A * | 4/1989 | Carper | B29C 65/606 264/249 |
| 5,390,407 | A * | 2/1995 | Musil | F16G 3/16 29/243.5 |
| 5,974,758 | A * | 11/1999 | Pielmeier | E06B 3/9636 52/656.2 |
| 6,327,826 | B1 * | 12/2001 | Mann | E06B 5/161 52/1 |
| 6,840,755 | B1 * | 1/2005 | Cook | B29C 65/606 425/508 |
| 7,870,656 | B2 * | 1/2011 | Eberlein | B21J 15/025 29/525.14 |
| 8,393,068 | B2 * | 3/2013 | Keener | B29C 66/21 29/525.06 |
| 9,381,563 | B2 * | 7/2016 | Li | B21J 15/147 |
| 2002/0125297 | A1 * | 9/2002 | Stol | B23K 20/1295 228/112.1 |
| 2005/0125985 | A1 * | 6/2005 | Adams | B29C 66/1122 29/524.1 |
| 2007/0204954 | A1 * | 9/2007 | Brunnecker | B29C 66/81423 156/272.8 |
| 2008/0117016 | A1 * | 5/2008 | Yu | H01H 37/761 337/401 |
| 2008/0236720 | A1 * | 10/2008 | Sigler | B29C 65/606 156/73.5 |
| 2009/0119860 | A1 * | 5/2009 | Amsel | B29C 66/21 15/167.1 |
| 2009/0178361 | A1 * | 7/2009 | Chen | B29C 48/18 52/656.2 |
| 2010/0018139 | A1 * | 1/2010 | Brunnhofer | E06B 3/222 52/204.5 |
| 2010/0037449 | A1 * | 2/2010 | Tresse | B29C 65/567 29/505 |
| 2010/0281811 | A1 * | 11/2010 | Knapp | B29C 48/07 52/656.2 |
| 2010/0319843 | A1 * | 12/2010 | Wust | E06B 3/221 156/244.13 |
| 2011/0011006 | A1 * | 1/2011 | Wuest | E06B 3/221 49/506 |
| 2015/0098755 | A1 * | 4/2015 | Karner | F16B 5/08 403/270 |
| 2015/0191961 | A1 * | 7/2015 | Yang | B29C 48/16 428/34.5 |
| 2015/0260208 | A1 * | 9/2015 | Baker | F16B 5/045 403/282 |
| 2015/0308181 | A1 * | 10/2015 | Wagner | E06B 3/30 52/656.2 |
| 2016/0123362 | A1 * | 5/2016 | Iwase | F16B 5/08 411/82 |
| 2017/0122352 | A1 * | 5/2017 | Van Niekerk | B29C 65/082 |
| 2017/0350186 | A1 * | 12/2017 | Philips | E06B 3/12 |
| 2018/0002974 | A1 * | 1/2018 | Harinck | E06B 3/726 |
| 2019/0048650 | A1 * | 2/2019 | Vaccari | E06B 3/222 |
| 2020/0003002 | A1 * | 1/2020 | Walter | E06B 5/116 |
| 2020/0082240 | A1 * | 3/2020 | Heitmar | E06B 3/222 |
| 2020/0263489 | A1 * | 8/2020 | Feil | E06B 3/968 |

* cited by examiner

PROCESS FOR THE REALIZATION OF REINFORCING BARS FOR DOOR AND WINDOW FRAMES

RELATED APPLICATIONS

This application is a National Phase of PCT Patent Application No. PCT/IB2019/052251 having International filing date of Mar. 20, 2019, which claims the benefit of priority of Italian Patent Application No. 102018000003783 filed on Mar. 20, 2018. The contents of the above applications are all incorporated by reference as if fully set forth herein in their entirety.

FIELD AND BACKGROUND OF THE INVENTION

The present invention relates to a process for the realization of reinforcing bars for door and window frames.

It is well known that there is a particularly strong need to make window and door frames that allow ensuring a degree of thermal insulation between the interior environments and the outside in order to reduce energy consumption.

Such need is particularly felt in the field of door and window frames made of plastic material, in particular PVC, despite the fact that they already have a high degree of thermal insulation compared to metal door and window frames on the market thanks to the reduced thermal conductivity of plastic.

These profiled elements are made of plastic resins and have a special multi-chamber structure inside the profiled elements themselves that allows ensuring a high degree of thermal insulation.

The plastic profiled elements made in this way have the main drawback of being not very resistant due to stresses and movements caused by forces exerted externally. With reference to this drawback, the prolonged exposure to sunlight, for example, involves heating the plastic profiled elements due to the transmission of heat by radiation with a consequent increased risk of deformation of the profiled elements themselves.

In order to overcome this drawback, the use is known of reinforcement elements introduced into the containment seats defined in the profiled elements, and which develop along the entire extension of the profiled elements themselves, to give greater stability and reinforcement to the structure of the profiled elements themselves.

Generally, these reinforcement elements are of the type of metal bars that are difficult to deform under impressed stresses and that are inserted into the containment seat and screwed to the structure of the profiled elements by means of machines provided with compressed air screwing systems.

The use of fixing screws implies heat transfer through the fixing screws themselves between the outside and the inside of the profiled element structure.

The plastic door and window frames thus made have the main drawback linked to the poor thermal insulation between the interior environments and the outside that the door and window frames themselves separate, with related costs for energy supply to maintain the desired temperature in the interior environments.

These drawbacks are at least partly remedied by the process for the realization of door and window frames in plastic material shown in the Italian patent application no. 102016000022110.

This process involves a step of insertion of the reinforcing bar inside the PVC profiled element and a step of fixing the reinforcing bar to the profiled element. The fixing of the reinforcing bar to the PVC profiled element is carried out by heating and softening a portion of the reinforcing bar itself and then pressing the softened portion onto the reinforcing bar, so as to fix the two.

SUMMARY OF THE INVENTION

This process for the realization of window and door frames in plastic material can however be upgraded.

For example, it is possible to envisage a process for the realization of reinforcing bars which allows obtaining a perfected reinforcing bar for the coupling to a corresponding PVC profiled element for the production of window and door frames. In addition, it is possible to envisage a process that allows significantly improving the thermal insulation provided by the window and door frames in order to limit the energy consumption necessary to maintain the desired temperature.

Another possible improvement relates to realizing a reinforcing bar to allow reducing times and costs involved in the realization of window and door frames.

A further improvement relates to obtaining a process for the realization of reinforcing bars for window and door frames that allows overcoming the aforementioned drawbacks of the prior art in the ambit of a simple, rational, easy, effective to use and low-cost solution.

BRIEF DESCRIPTION OF THE SEVERAL VIEWS OF THE DRAWINGS

Other characteristics and advantages of the present invention will be more evident from the description of a preferred, but not exclusive, embodiment of a process for the realization of reinforcing bars for window and door frames, illustrated by way of an indicative, but non-limiting example, in the attached tables of drawings in which.

DESCRIPTION OF SPECIFIC EMBODIMENTS OF THE INVENTION

Figure 1:
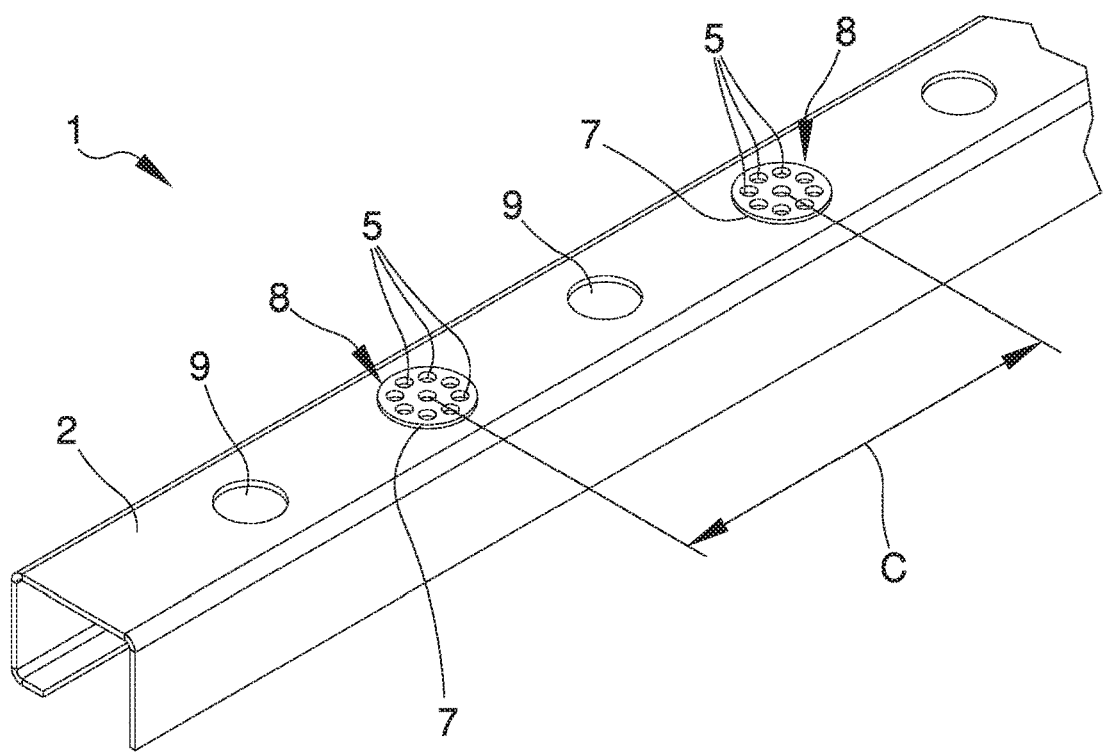
FIG. 1 is an axonometric view of a reinforcing bar obtained by means of the process according to the invention.
Figure 2:
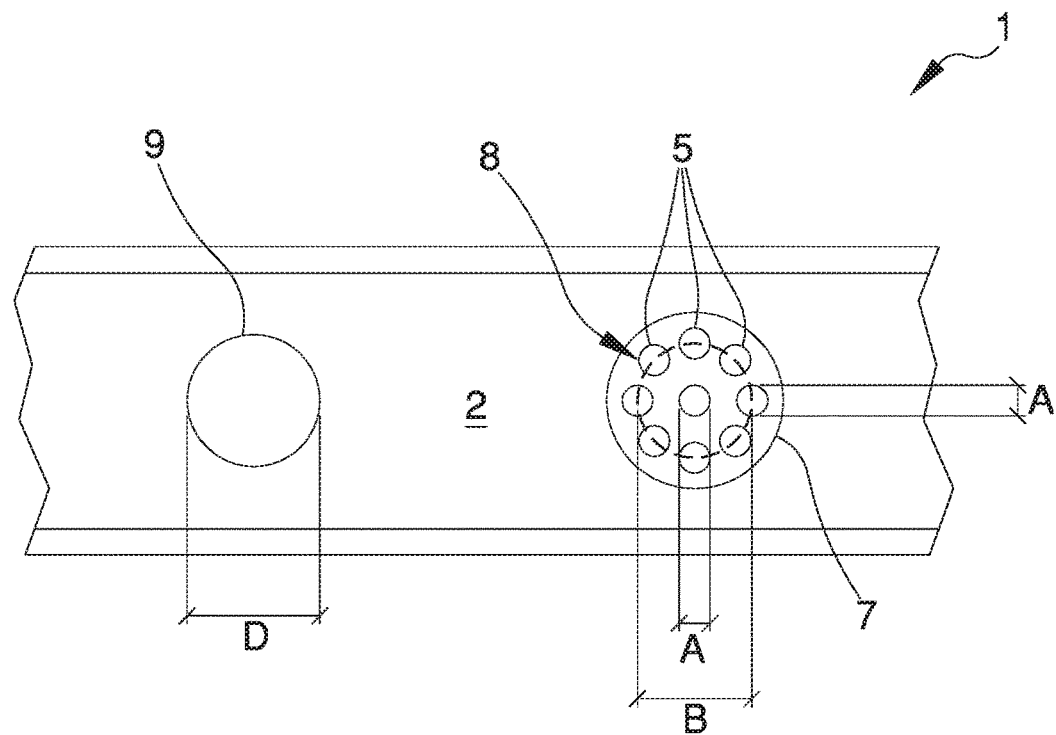
FIG. 2 is a top view of a detail of FIG. 1.
Figure 3:
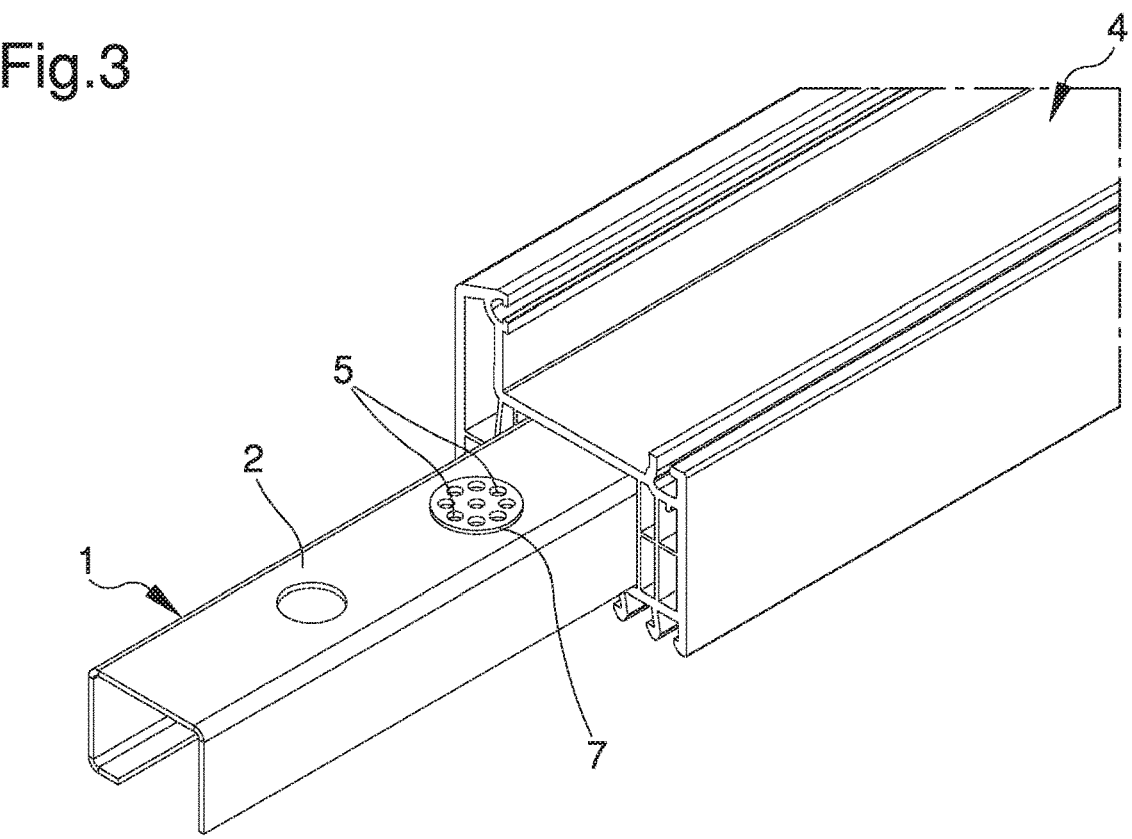
FIG. 3 is an axonometric view of the insertion of the reinforcing bar obtained by means of the process according to the invention in a relative profiled element.
Figure 4:
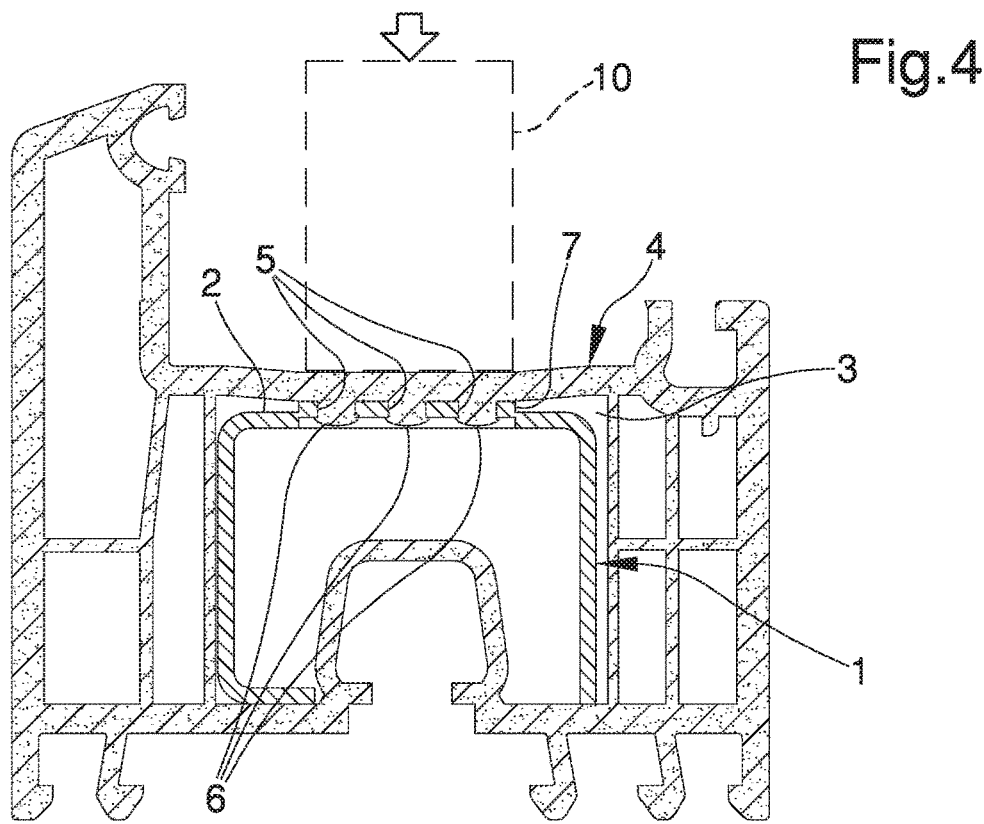
FIG. 4 is a cross-sectional view of the profiled element for window and door frames containing the reinforcing bar of FIG. 1.

The process for the realization of reinforcing bars for window and door frames comprises at least one step of providing at least one reinforcing bar 1 made of a metal material having at least one drillable face 2.

This reinforcing bar 1 is intended for the production of window and door frames, in particular it is introduced into a special containment seat 3 defined in a profiled element 4, in order to give greater stability and reinforcement to the structure of the profiled element itself.

Preferably, the metal material of which the reinforcing bar 1 is made up is steel, although the possibility of using a different type of metal material cannot be ruled out.

Usefully, the step of providing the reinforcing bar 1 comprises at least the step of providing at least one slab made of metal material and at least one step of bending the slab itself to obtain the reinforcing bar 1.

In the embodiment shown, the reinforcing bar 1 has a tubular shape with a substantially U-shaped profile, although the possibility of providing a reinforcing bar with a different shape cannot be ruled out.

The process according to the invention comprises at least one step of drilling of the drillable face 2 to obtain at least one fixing hole 5 in the reinforcing bar 1 having at least one characteristic dimension A comprised between 2 mm and 5 mm.

The possibility of providing the reinforcing bar 1 with a plurality of drillable faces 2 on which making the fixing hole 5 cannot be ruled out.

The reinforcing bar 1 obtained by means of the present process is insertable into a profiled element 4 made of plastic material and the fixing hole 5 is configured to be penetrated by the softened plastic material of the profiled element 4 to define a riveting portion 6 for fixing the profiled element 4 to the reinforcing bar 1.

In particular, when the plastic material, typically PVC, from which the profiled element 4 is made, is heated, it begins to soften and to enter a plastic state.

As a result, when this plastic material is pressed at the fixing hole 5, it penetrates the hole itself and expands.

The dimension of the fixing hole 5 is however set in such a way that when the plastic material cools down it cannot withdraw from the hole itself, so that the riveting portion 6 is formed, which prevents the accidental separation of the profiled element 4 from the reinforcing bar 1.

In this way, moreover, it is possible to assemble the profiled element and the reinforcing bar without the need to provide for metal means of connection, such as screws and bolts, thus ensuring the thermal insulation of the frame obtained. Advantageously, the characteristic dimension A is comprised between 3 mm and 4 mm.

Preferably, the characteristic dimension A is equal to 3.5 mm, in order to optimize the fixing of the profiled element 4 to the reinforcing bar 1, although the possibility cannot be ruled out of providing a characteristic dimension A of the fixing hole 5 equal to a different value but always within the range indicated above.

In the preferred embodiment shown in the illustrations, the fixing hole 5 has a substantially circular shape and, consequently, the characteristic dimension A corresponds to the diameter of the hole itself, although the possibility cannot be ruled out of making the fixing hole 5 with a different shape, such as e.g. a polyhedral shape.

The step of drilling can be carried out by means of various methods, such as e.g. punching, boring, or the like.

Usefully, the drillable face 2 is shaped so as to define at least one substantially protruding embossing element 7, in which the fixing hole 5 is substantially obtained at the embossing element 7.

In particular, the embossing element 7 is composed of a relief, similar to a thickening, protruding outwards with respect to the rest of the drillable face 2, which allows reducing the gap between the reinforcing bar 1 and the PVC profiled element 4.

This measure allows facilitating the penetration of the softened plastic material inside the fixing hole 5, thus reducing the force to be applied to PVC to achieve this penetration, and therefore the coupling between the profiled element 4 and the reinforcing bar 1.

Advantageously, the step of drilling is performed to obtain a plurality of fixing holes 5 in the drillable face 2.

In the particular embodiment shown in the illustrations, the fixing holes 5 are substantially formed at the embossing element 7, although the possibility of providing for a different distribution cannot be ruled out.

These fixing holes 5 are configured to be penetrated by the softened plastic material of the profiled element 4 to define a plurality of riveting portions 6 for fixing the profiled element 4 to the reinforcing bar 1.

As shown in the illustrations, the fixing holes 5 are arranged in a substantially circular configuration to define at least one fixing assembly 8 with a diameter B comprised between 5 mm and 25 mm.

The special measure of providing for the realization of a fixing assembly 8 allows for obtaining an increase in the stability of the connection between the profiled element 4 and the reinforcing bar 1.

In particular, the diameter B is comprised between 10 mm and 16 mm.

In the preferred embodiment shown, the diameter B is equal to 13 mm, although the possibility of providing for a different diameter B cannot be ruled out, provided that it is within the range of values provided above.

Still in the preferred embodiment shown in the illustrations, the fixing assembly 8 also comprises a central fixing hole 5, which allows improving the distribution of the stresses in the coupling between the profiled element 4 and the reinforcing bar 1.

Usefully, the process comprises a plurality of steps of drilling the drillable face 2 to obtain a plurality of fixing assemblies 8, so as to optimize the coupling and distribute the stresses along the entire drillable face 2.

The fixing assemblies 8 are substantially equidistant from each other and the distance C from the center of at least one of the fixing assemblies 8 to the center of at least one adjacent fixing assembly 8 is substantially greater than 50 mm. Preferably, the distance C is comprised between 80 mm and 120 mm and in particular it is equal to 100 mm, although the possibility of providing for a different value cannot be ruled out provided that it is within the range indicated above. Advantageously, the process also comprises at least one step of secondary drilling adapted to make at least one detection hole 9 on the reinforcing bar 1.

The presence of this detection hole 9 is particularly useful in the fixing of the profiled element 4 to the reinforcing bar 1, which is done automatically by means of special machines, so it is useful for detecting the position of the fixing holes 5, which are not visible since they are covered by the plastic material.

In particular, the machinery used for the fixing of the profiled element 4 to the reinforcing bar 1 may be provided with detection means for detecting the detection hole 9, such as e.g. magnetic means which make it possible to detect the spots where no metal material is present, so as to obtain the position of the fixing holes 5.

In particular, as can be seen from the illustrations, the detection hole 9 is made on the drillable face 2 in an intermediate position between two adjacent fixing assemblies 8.

The step of secondary drilling is performed to obtain a plurality of detection holes 9 on the drillable face 2.

In the particular embodiment shown in the illustrations, the detection holes 9 are obtained at the midpoint of the distance C between two consecutive fixing assemblies 8, although the possibility of providing for a different type of arrangement cannot be ruled out.

Preferably, in the embodiment shown in the illustrations, the detection holes 9 have a detection diameter D comprised between 5 mm and 30 mm, in particular equal to 15 mm.

Thanks to the process for the realization of reinforcing bars for door and window frames described above, it is possible to implement a process for the realization of profiled elements for door and window frames, which comprises all the steps described above, as well as the subsequent steps of:

provinding at least one profiled element 4 made of a plastic material for the realization of window and door frames;

inserting the reinforcing bar 1 inside the containment seat 3; and fixing the profiled element 4 to the reinforcing bar 1 by means of suitable fixing means.

Usefully, the profiled element 4 is adapted to make frames and hinged elements such as windows or doors.

The profiled element 4 is made of PVC, but also plastic materials of the heat-sealable type other than PVC cannot be ruled out.

In order to allow several profiled elements 4 to be joined together by sealing, each profiled element 4 comprises one pair of head surfaces suitably cut at 45° to define a right-angled coupling, although the possibility of cutting the head surfaces at different angles cannot be ruled out.

As previously described, the process comprises a step of insertion of the reinforcing bar 1 inside the containment seat 3 by means of appropriate means of insertion.

The profiled element 4, in fact, is provided with a containment seat 3 of the reinforcing bar 1 defining a space such as to contain the reinforcement element itself substantially to measure.

In actual facts, in some cases, there is some play between the reinforcing bar 1 and the containment seat, so the fact of providing the embossing elements 7 on the drillable face 2 of the reinforcing bar 1 allows cancelling the play and obtaining a coupling to measure.

The fixing step comprises a preliminary step of providing at least one fixing machine adapted to allow the automated fixing of the profiled element 4 to the reinforcing bar 1.

Advantageously, the fixing step also comprises a heating step at localized portions of the profiled element 4 by means of electromagnetic induction means to obtain the heated and therefore, softened portion.

In the preferred embodiment shown in the illustrations, the electromagnetic induction means are associated with the fixing machine and comprise an electromagnet and alternating current power supply means adapted to power the electromagnet itself for the generation of a magnetic field with frequencies of the order of hundreds of KHz.

The power supply of the electromagnet by means of the AC power supply means generates induced currents, commonly known as Foucault currents, on the reinforcing bar 1 made of a metal material immersed in the magnetic field generated by the electromagnetic induction means.

These Foucault currents are adapted to heat the reinforcing bar 1 in precise positions, with a consequent heat dissipation due to the Joule effect to the profiled element 4, which heats and softens.

Depending on the power supplied by the power supply means to the electromagnet, the Foucault currents induced on the reinforcing bar 1 vary and, consequently, also the amount of heat dissipated due to the Joule effect.

Advantageously, the electromagnetic induction means are adapted to induce the Foucault currents on particular areas of interest of the reinforcing bar.

The possibility cannot be ruled out of carrying out the heating step by means other than electromagnetic induction means, such as e.g. ultrasonic means, which allow the plastic material to be heated by means of vibrations.

The heating step comprises a softening step of the portion of the profiled element 4, in which the portion of the heated reinforcing bar 1 is placed in contact with the profiled element 4.

More specifically, the portion of the heated reinforcing bar 1 is adapted to conduct heat to the profiled element 4, so that it can be softened at specific spots.

In the context of the present discussion, the term "softened" means the particular thermodynamic state in which the plastic material, in this particular case PVC, subjected to heat conduction, reaches the softening point.

Usefully, the fixing step comprises a pressure step of a portion of the softened profiled element 4 at least partly inside the fixing hole 5 and this pressure step is carried out after the softening step.

The possibility cannot however be ruled out of carrying out the heating step substantially at the same time as the pressure step, in order to reduce fixing times. This pressure step is carried out by means of suitable pressing means 10 housed on the fixing machine.

In particular, the pressing means 10 are adapted to exert a pressing force in such a direction so as to allow the insertion of the softened plastic material inside the fixing hole 5.

Preferably, the pressing means 10 are selected out of hydraulically or electrically operated punches and rollers, which impress the pressing force on the outer surface of the softened profiled element 4, to define the fixing portion.

The pressing means 10 are movable along a direction of pressure substantially orthogonal to the external surface of the profiled element 4 at the fixing hole 5.

As described above, the reinforcing bar 1 usefully comprises the embossing elements 7, which allow reducing the gap between the reinforcing bar itself and the profiled element 4.

As a result, such measure allows reducing the force that the pressing means 10 must apply to the profiled element 4 in order to make the softened plastic material penetrate into the fixing holes 5, to define the riveting portions 6.

In particular, the force to be applied in the event of the reinforcing bar 1 being provided with embossing elements 7 is of the order of ten times less than in the event of not being provided with the latter, with a consequent reduction in the costs associated with the realization of the window or door frame.

In addition, the fixing machine comprises detection means adapted to detect the presence of the detection holes 9, so as to calculate the point at which the pressing means 10 must exert pressure.

The detection means are usefully of the type of magnetic detection means, although the possibility of using different means, such as x-ray detection means or the like, cannot be ruled out.

The process also comprises a step of sealing a plurality of profiled elements 4 for the realization of a window or door frame.

This step of sealing is carried out after the step of fixing each profiled element 4 to a respective reinforcing bar 1.

It has in practice been found that the described invention achieves the intended objects.

In this regard, it should be noticed that the special measure of providing a process for the realization of reinforcing bars for door and window frames allows improvements to be made to known processes for the realization of profiled elements for window and door frames.

In addition, the special measure of providing for at least one step of drilling of the reinforcing bar makes it possible to obtain an upgraded reinforcing bar for coupling to a corresponding PVC profiled element for the production of window and door frames.

Furthermore, the special measure of providing for the realization of a plurality of fixing holes to define a fixing assembly allows significantly improving the thermal insulation provided by the window and door frames, so as to limit the energy consumption necessary to maintain the desired temperature.

In addition, the special measure of providing for a plurality of steps of drilling to make a plurality of fixing assemblies makes it possible to ensure secure fixing along the entire window or door frame and to reduce the times and costs associated with the realization of window and door frames.

What is claimed is:

1. A process for reinforcing door and window frames, comprising:
    providing a reinforcing bar (1) made of a metal material having at least one drillable face (2),
    drilling in said at least one drillable face (2) to obtain at least one fixing hole (5) in said reinforcing bar (1) having at least one characteristic dimension (A) comprised between 2 mm and 5 mm,
    inducing a penetration of at least one riveting portion (6) of a profiled element (4) into said at least one fixing hole (5) for fixing said profiled element (4) to said reinforcing bar (1) without screws or fasteners;
    wherein the at least one riveting portion (6) is made of softened plastic material;
    wherein said process comprises secondary drilling to form at least one detection hole (9) on said reinforcing bar (1);
    wherein:
    said drilling is performed to form a plurality of fixing holes (5) in said reinforcing bar (1);
    said plurality of fixing holes (5) are arranged in each of a plurality fixing assemblies formed along the reinforcing bar (1) in a circular configuration with a diameter (B) between 5 millimeter (mm) and 25 mm;
    said drilling forms the at least one fixing assembly (8); and
    said at least one detection hole (9) is made on said at least one drillable face (2) in an intermediate position between two of said plurality fixing assemblies (8).

2. The process according to claim 1, wherein said characteristic dimension (A) is between 3 mm and 4 mm.

3. The process according to claim 1, wherein said characteristic dimension (A) is 3.5 mm.

4. The process according to claim 1, wherein said providing said reinforcing bar (1) comprises providing at least one slab of metal material and bending said slab to obtain said reinforcing bar (1).

5. The process according to claim 1, wherein said at least one drillable face (2) is shaped to define at least one substantially protruding embossing element (7), said at least one fixing hole (5) being obtained substantially at said embossing element (7).

6. The process according to claim 1, wherein said at least one fixing hole (5) comprises a plurality of fixing holes; wherein said drilling is performed to obtain the plurality of said fixing holes (5) in said reinforcing bar (1).

7. The process according to claim 6, wherein said plurality of fixing holes (5) are arranged in a substantially circular configuration to define at least one fixing assembly (8) with a diameter (B) comprised between 5 mm and 25 mm.

8. The process according to claim 7, wherein said diameter (B) is comprised between 10 mm and 16 mm.

9. The process according to claim 8, wherein said diameter (B) is equal to 13 mm.

10. The process according to claim 7, wherein said drilling of said at least one drillable face (2) is performed multiple time to obtain a plurality of fixing assemblies (8) in said reinforcing bar (1).

11. The process according to claim 10, wherein said plurality of fixing assemblies (8) are equidistant from each other with distance (C) from a center of one of said plurality of fixing assemblies (8) to a center of another of said plurality of fixing assemblies (8) which is greater than 50 mm.

12. The process according to claim 11, wherein said distance (C) is between 80 millimeter (mm) and 120 mm.

13. The process according to claim 12, wherein said distance (C) is equal to 100 mm.

14. The process according to claim 1, wherein said secondary drilling is performed to obtain a plurality of detection holes (9) on said at least one drillable face (2).

* * * * *